(12) United States Patent
Palazzolo

(10) Patent No.: US 6,725,744 B2
(45) Date of Patent: Apr. 27, 2004

(54) POWER TRAIN ASSEMBLY

(75) Inventor: Joseph Palazzolo, Livonia, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/115,147

(22) Filed: Apr. 3, 2002

(65) Prior Publication Data

US 2003/0040399 A1 Feb. 27, 2003

Related U.S. Application Data

(60) Provisional application No. 60/315,119, filed on Aug. 27, 2001.

(51) Int. Cl.[7] .............................................. F16H 37/06
(52) U.S. Cl. ............................. 74/665 GC; 74/665 GE; 180/233
(58) Field of Search ............................... 180/233, 251; 74/665 GC, 665 GE, 665 GT

(56) References Cited

U.S. PATENT DOCUMENTS

| | | | | |
|---|---|---|---|---|
| 4,476,952 A | * | 10/1984 | Suzuki | 180/247 |
| 4,577,721 A | * | 3/1986 | Ashikawa | 180/248 |
| 4,712,448 A | * | 12/1987 | Lanzer | 74/665 GC |
| 4,805,718 A | * | 2/1989 | Iwata et al. | 180/233 |
| 6,076,623 A | * | 6/2000 | Teraoka et al. | 180/233 |
| 6,158,303 A | * | 12/2000 | Shiraishi et al. | 74/665 T |

* cited by examiner

Primary Examiner—Dirk Wright
(74) Attorney, Agent, or Firm—Brinks Hofer Gilson & Lione

(57) ABSTRACT

A power train assembly for an all wheel drive automotive vehicle. The power train assembly includes a transmission assembly having a transmission output. A final drive unit is coupled to the transmission output and includes a torque multiplier. After torque multiplication, power from the final drive is provided to the front wheels of the vehicle. A power transfer unit diverts power from the transmission to the rear wheels of the vehicle. The power transfer unit is coupled to the transmission output such that power is received therefrom prior to torque multiplication by the final drive unit.

18 Claims, 3 Drawing Sheets

POWER TRAIN ASSEMBLY

CROSS-REFERENCE TO RELATED APPLICATIONS

The present this invention claims priority to U.S. provisional application Serial No. 60/315,119, filed Aug. 27, 2001, entitled "Power Train Assembly".

BACKGROUND

1. Field of the Invention

The present invention generally relates to motor vehicle power train assemblies. More specifically, the present invention relates to a power train assembly having a power transfer unit located prior to a final drive unit.

2. Description of the Prior Art

Historically, automobiles in the United States have primarily utilized a rear wheel drive power delivery schemes. In adapting these rear wheel drive schemes into four wheel drive applications, a transfer case was, and often still is, positioned at the output of the transmission assembly. When engaged, the transfer case diverts a portion of the power coming from the transmission assembly from the rear wheels to the front wheels.

Today, a significant portion of new automobiles in the United States, and perhaps the world, are front wheel drive based vehicles. In a typical front wheel drive vehicle, typically both the engine and the transmission assembly are transversely oriented relative to the vehicle. By positioning the engine and transmission assembly transversely in the vehicle, a more direct coupling of the transmission assembly to the vehicle's transaxle and front wheels is achieved. In doing so, the final drive unit (where the last torque multiplication takes place) and the front wheel differential are often incorporated directly into the transmission assembly itself.

With front wheel drive vehicles themselves becoming a mature market, a recent trend in the automobile industry has been to adapt front wheel drive schemes for all or four wheel drive applications. This is accomplished by providing a power transfer unit that diverts a portion of the power from the front wheels to a rear wheel drive shaft and, subsequently, the rear wheels.

Seen in FIGS. 1a and 1b is a typical prior art power transfer unit 10. The power transfer unit 10 includes a housing 12 within which is located a gear set 14 comprised of a parallel gear set 16 and a non-parallel gear set 18. The parallel gear set 16 includes a cylindrical extension 20 that operates as its input and this input 20 is coupled to the transversely oriented output 22 of the transmission assembly by way of a splined engagement 24. The cylindrical extension 20 itself is an extension off of a gear wheel 26 or may be a sleeve to which the gear wheel 26 mounts. From the gear wheel 26, power is transferred through a second and third gear wheel, respectively 32 and 34. These gear wheels 32 and 34 are each supported on bearings 36 for rotation about axes 38 and 40 that are parallel to the rotational axis 28 of the first gear wheel 26.

The non-parallel gear set 18 includes a bevel ring gear 44 that is mounted to a shaft or sleeve 42 onto which the third wheel gear 34 is mounted or formed therewith. The bevel ring gear 44 engages a bevel gear 46 mounted to another shaft 48 whose axis is generally perpendicular (and therefore non-parallel) to that of shaft 42. Mounted to an opposing end of the shaft 48 is an output member 50, illustrated as including a flange 52 and appropriately located bolt openings 54. The latter features enable the output member 50 to be bolted to a rear drive shaft (not shown).

As seen in FIG. 1a, the line 56 along which the gear wheels 26, 32 and 34 of the parallel gear set 16 engage with one another generally corresponds with the axis about which the output member 50 rotates. When locating of the power transfer unit 10 relative to the output of the transmission 22, it is clear that this line 56 may be offset from the centerline of the vehicle. Additionally and as seen in FIG. 1b, the axis 28 of input into the power transfer unit 10, is offset, vertically or elevationally in the vehicle, relative to the output axis 58 about which the output member 50 rotates. This "drop" or height decrease from the transmission assembly output 22 to the output member 50 results from the relative positioning of the first, second and third helical gears 26, 32 and 34 of the parallel gear set 16, in conjunction with the non-parallel gear set 18. The non-parallel gear set 18 is a hypoid beveled gear set where the axis of rotation 40 of the bevel ring gear 44 does not intersect the axis 58 of rotation of the bevel gear 46.

Located within the transmission assembly, and before the output 22 thereof, is a final drive unit (illustrated schematically as box 57). The final drive unit 57 performs the last torque multiplication in the power train and is configured in any one of a number of conventional constructions well known in the art. One such construction is a planetary gear set with the input to the final drive unit being through a sun gear while the output of the final drive assembly is through a ring gear. The ring gear may be directly coupled to the transmission output 22 and therefore a large amount of torque is delivered to the power transfer unit.

Since the power transfer unit receives power after the final drive assembly 57, the components of the power transfer unit 10 must be robust enough for high torque loads to pass there through. This adds weight and expense to the power transfer unit.

In view of the above and other limitations on the prior art, it is an object of the present invention to provide a drive train construction that permits a decrease in the weight of the system. In doing so, the present invention provides a power transfer unit located in the power train assembly prior to torque multiplication by the first drive unit.

SUMMARY OF THE INVENTION

The present invention overcomes the limitations of the prior art by packaging the power transfer unit such that it receives power from the transmission assembly before torque multiplication by the final drive unit. The present invention may therefore be seen as a power transfer unit that includes a parallel gear set that receives its input from an intermediate output of the transmission assembly. The power transfer unit includes a parallel gear set, more specifically a drive sprocket wheel that transfers rotation to an output sprocket wheel through either an intermediate transfer wheel, a transfer chain or belt. The output sprocket wheel is mounted axis is generally parallel to the axis about which the drive sprocket wheel rotates the output axis of the transmission assembly. That shaft then transfers power to a non-parallel gear set.

In the non-parallel gear set, a hypoid bevel gear is mounted to or coaxial with the same shaft as the output sprocket wheel so as to rotate therewith. The hypoid bevel gear engages a hypoid pinion gear mounted to a second shaft, this second shaft being oriented generally perpendicularly to the first shaft. On the distal end of the second shaft is the output member of the power transfer unit. This output member couples the power transfer unit to the rear drive shaft of the vehicle.

In another aspect, the present invention uses a power transfer unit, coupled to an output of the transmission assembly before the final drive unit, with a non-parallel gear set being coupled to the output of the transmission assembly. The output of the non-parallel gears set is then used as the input into a parallel gear set, if desired or required. Subsequent to the input of the power transfer unit, the output of the transmission assembly is also provided to a final drive unit. Final torque multiplication takes place in the final drive unit, which may be a planetary gear set using its sun gear as the input. From the final drive unit, power is supplied to a front differential and thereafter to the front wheels of the vehicle.

By incorporating the power transfer unit on the front transaxle before the final drive unit, the power transfer unit is subjected to less torque and can be smaller, lighter and simpler in design.

In one aspect, the present invention is therefore seen to be a drive train having a power transfer unit adapted to connect to an intermediate output portion of a transmission assembly in a primary drive line, with the power transfer unit also being coupled to a secondary drive line.

Additional objects and features of the present invention will be readily apparent to those skilled in the art from a review of the attached drawings, the following detailed description and the appended claims.

DETAILED DESCRIPTION OF THE PREFERRED EMBODIMENTS

Figure 1A:
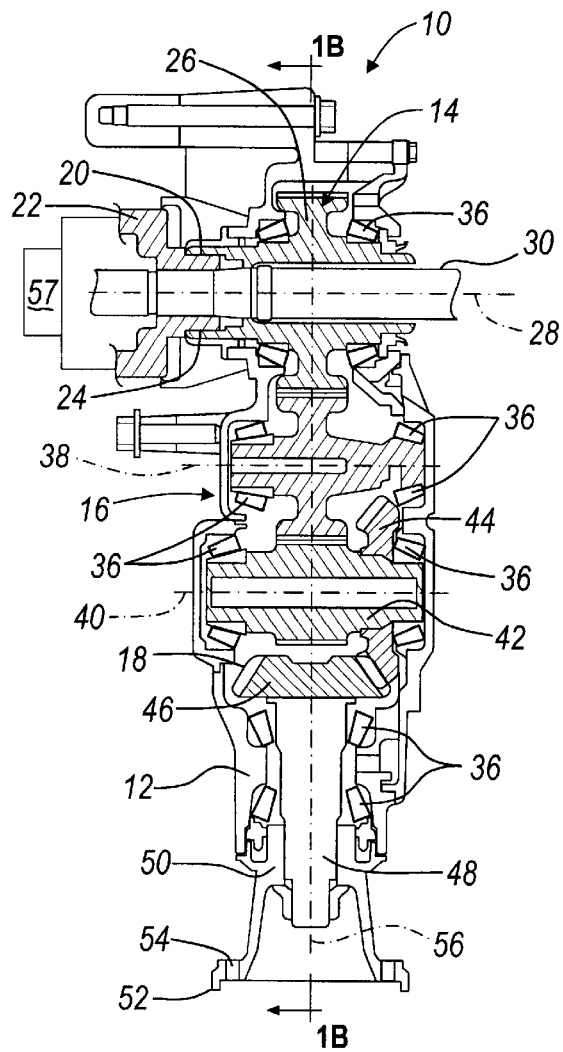
FIG. 1a is a cross-sectional view of a power train assembly according to the prior art incorporating a power transfer unit.
Figure 1B:
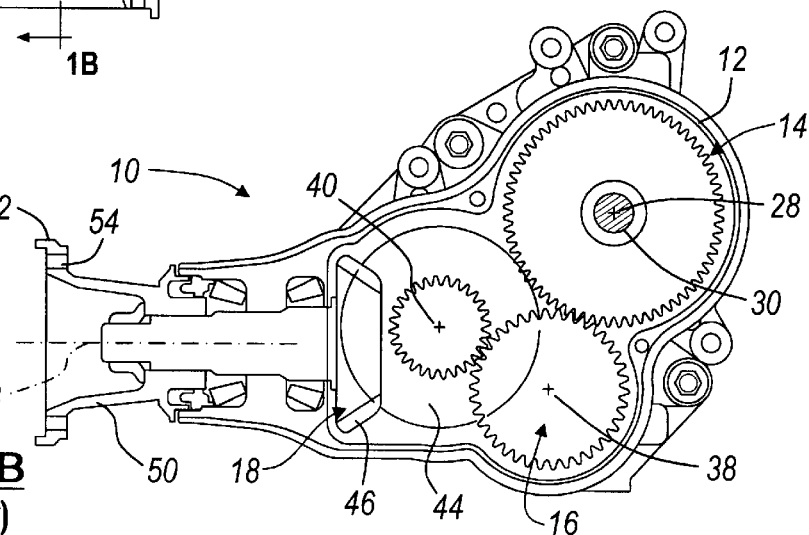
FIG. 1b is a cross-sectional view, taken generally along line 1b—1b in FIG. 1a, further illustrating a power train assembly according to the prior art.
Figure 2:
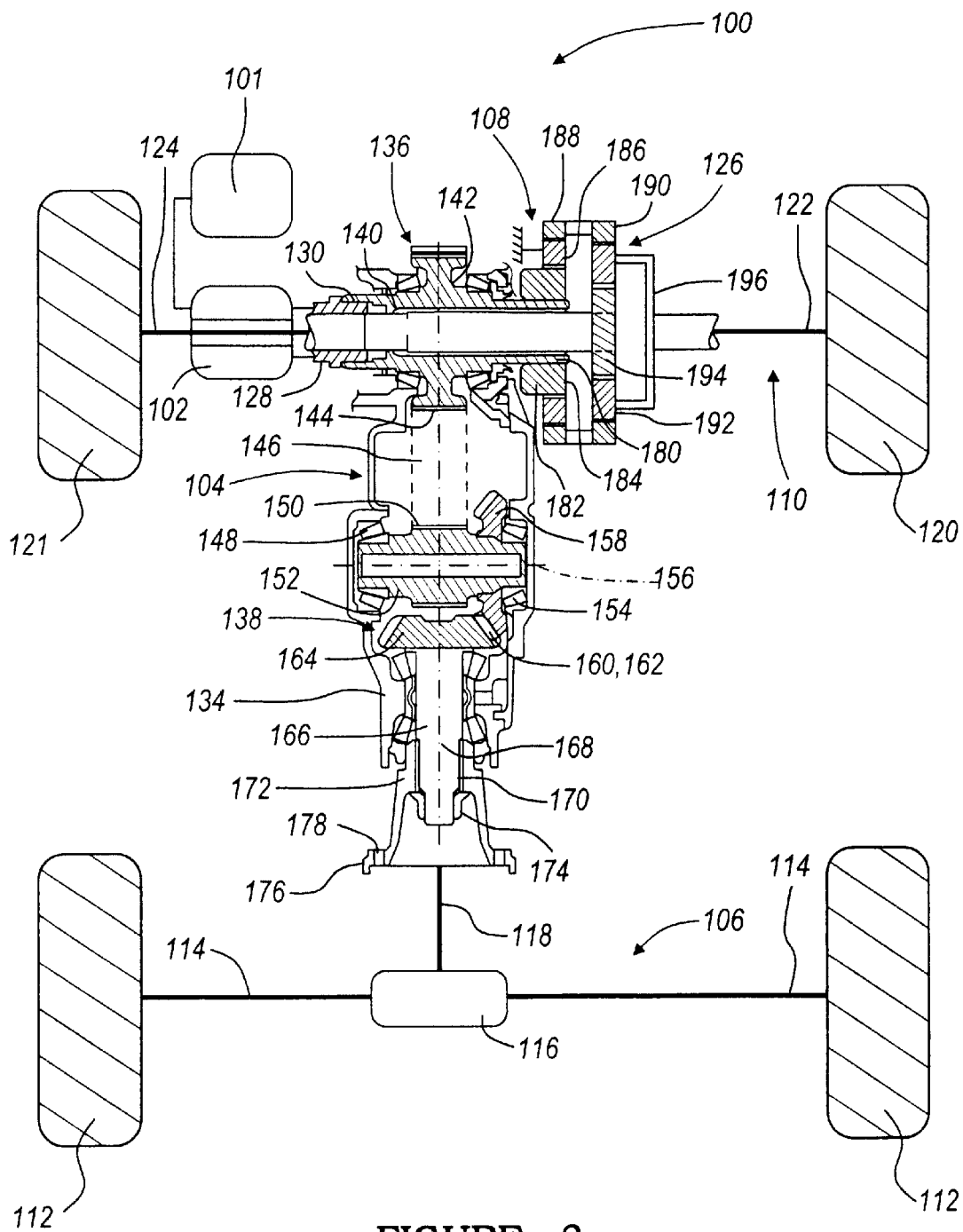
FIG. 2 is a schematic and cross-sectional view of a power transfer unit according to the principles of the present invention.

Referring now to the drawings, FIG. 2 illustrates a power train assembly 100 according to the principles of the present invention. The illustrated power train assembly 100 includes A power plant 101, a transmission assembly 102, a power transfer unit 104, a rear driveline 106, a final drive unit 108 and a front drive line 110. As will be readily noted, all the components illustrated in FIG. 2 are not to scale with one another and some components are schematically illustrated therein. The subassemblies of those components will be readily appreciated by persons skilled in the are and therefore are not more fully discussed or illustrated herein. They will, however, be briefly mentioned 25 context to those components more fully discussed herein. The rear driveline 106 terminates in a pair of rear wheels 112 that are coupled to left and right rear half shafts, collectively referred to as the rear axle 114. A rear differential 116 splits torque or power between the rear wheels 112 and is coupled by a rear drive shaft 118 to the power transfer unit 104, briefly mentioned above and more fully discussed below. The front driveline 110 includes a pair of front wheels 120. The front wheels 120 are similarly coupled to right and left half shafts 122 and 124, which are in turn coupled to the outputs of the differential 126. The front differential 126 splits torque between the front wheels 120 and receives its torque input from the output of the final drive unit 108. It is in this final drive unit 108 that final torque multiplication takes place. The final drive unit 108 and the front differential 126 are both more fully described below. In most instances, the power plant 101 will be an internal combustion engine. It could, however, be other types of engines or power plants including diesel, hybrid electric, fuel cell, etc. Those types of power plants may similarly affect and alter other components of the power train assembly 100 from that described herein. The power plant 101 is coupled to the transmission assembly 102, which may be manual or automatic. The transmission assembly 102 includes an output 128 that is coupled to an input 130 of the power transfer unit 104. Engagement between the transmission's output 128 and the power transfer unit's input 130 may be any one of the many conventional engagement schemes and is illustrated as a splined engagement. Additionally, the principal components of the power transfer unit 104 are enclosed within a housing 134 and include a parallel gear set 136 and non-parallel gear set 138.

As used herein, the term "parallel gear set" is intended to refer to any mechanism (including, without limitation, mechanisms with gear wheels, mechanisms without gear wheels, gear trains, chain gears and belt systems), which transfers power from a first shaft or axis to a second shaft or axis; the first and second shafts defining axes that are generally parallel to one another.

As used herein, the term "non-parallel gear set" is intended to refer to any mechanism (including, without limitation, mechanisms with gear wheels, mechanisms without gear wheels, gear trains, chain gears and belt systems for transferring power from a first shaft or axis to a second shaft or axis; wherein the first and second shafts define axes that are not generally parallel to one another.

The input 130 of the power transfer unit 104 is received within a housing (not shown) of the transmission assembly 102 as are various components of the power transfer unit 104. The input 130 of the power transfer unit 104 is an internally splined cylindrical sleeve or hub 140 integrally formed with a first gear wheel 142 in the parallel gear set 136. Alternatively, the input 130 may be a sleeve non-unitarily formed with the gear wheel 136.

The first gear wheel 142 is rotatably supported about one of the front half shafts 122, 124 and includes external teeth 144 or other means that aid in transferring rotation, by way of a belt 146 (shown in phantom) chain or equivalent means to a second gear wheel 148. Depending on what the specific design criteria dictates, the second gear wheel 148 may be larger, smaller or the same diameter as the first gear wheel 142. The second gear wheel 148 is similarly provided with external teeth 150 to engage the belt 146. The second gear wheel 148 is integrally formed with a hub 152 and is rotatably supported within the housing, by bearings 154, for rotation about an axis 156. Alternatively, the second gear wheel 148 may be mounted on a shaft supported by the bearing 154. The axis 156 of the second gear wheel 148 is generally parallel to the axis of rotation of the first gear wheel 142 (as defined by the half shafts 122, 124) and these features make up the parallel gear set 136.

When incorporated into an automotive vehicle, and as other design criteria may dictate, the height or elevation of the axis 156, relative to the half shafts 122, 124 may be the same or different. In the situation where axis 156 is lower than axis the half shafts 122, 124, it will be appreciated that the parallel gear set 136 operates as a "chain drop".

As an alternative to the belt 146 seen in FIG. 2, a series of gear wheels or a gear train may be employed.

The hub 152 of the second gear wheel 148 is further used to transfer power to the non-parallel gear set 138. In the embodiment of FIG. 2, the non-parallel gear set 138 is a hypoid bevel gear set. The non-parallel gear set 138 therefore includes a first bevel gear 158 mounted to the hub 152 and which, through intermeshing teeth 160 and 162, engages a second bevel gear 164. The second bevel gear 164 is mounted by conventional means to a shaft 166 (supported by bearings within the housing 134 of the power transfer unit 104) oriented along an axis 168 that is generally perpendicular axis 156 defined by the hub 152. The axes 156 and 168 are offset and do not intersect such that the illustrated non-parallel gear set 138 is accordingly a hypoid bevel gear set.

The output of the power transfer unit 104 is an externally splined distal end 170 of the shaft 166, the splines of which receives and engages an output member 172. Retention of the output member 172 to the shaft 166 can be by any conventional means, including a retainer nut 174 threadably attached to the shaft 166 as seen in FIG. 2. A flange 176 provided with a series of bolt holes 178 enables the output member 172 to be readily connected to the rear drive shaft 118.

Figure 3:
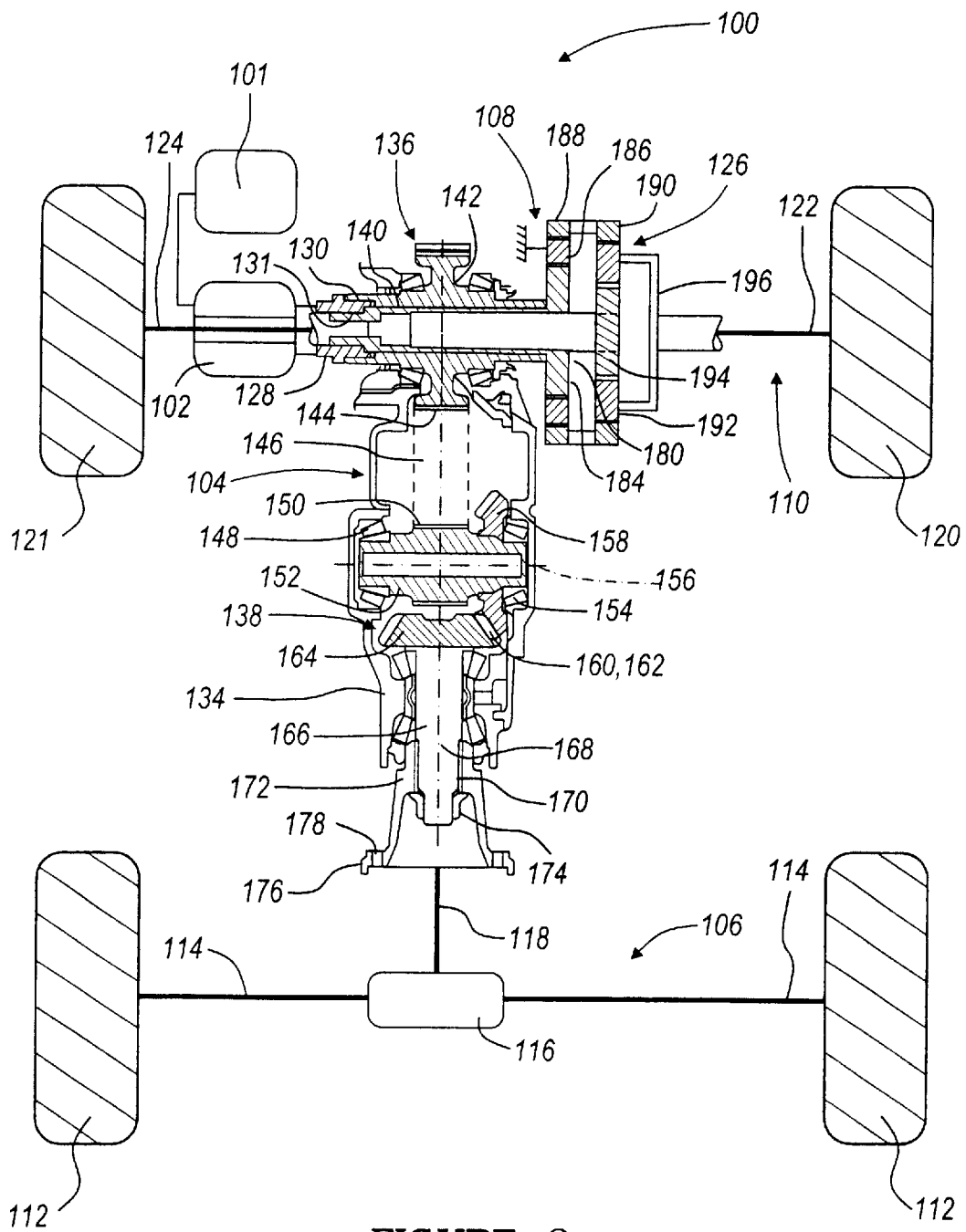
FIG. 3 is a schematic and cross-sectional view of an alternate power transfer unit according to the principles of the present invention.

As briefly mentioned above, the output 128 from the transmission assembly 102 is provided to the final drive unit 108, in addition to the power transfer unit 104. In providing power to the final drive unit 108 as illustrated via the hub 140 and input member 182 in FIG. 2, the opposing end 180 of the hub 140 of the first gearwheel 142 is or may be splined to receive in engagement thereon the input 182 of the first drive 108. Alternatively and as illustrated via the hub 140 and input member 182 in FIG. 3, the input member 182 may directly couple with the output 128 of the transmission assembly 102. The direct coupling can be achieved by input member 182 having a surface 131 contacting the output 128 of the transmission assembly 102.

In the preferred embodiment of FIG. 2, the final drive unit 108 is provided as a planetary gear set (alternatively, other torque multiplication mechanisms may be employed) with its sun gear 184 integrally formed as or coupled to the input member 182. Depending on the design criteria of the intended application, either the planetary gears 186 or the ring gear 188 may be rotationally fixed. The planetary gears 186 are rotationally fixed in FIG. 2 and this means the ring gear 188 operates as the output of the final drive unit 108. The output of the final drive unit 108, with its increased torque, is then provided to an input of the front differential 126.

In the illustrated embodiment of FIG. 2 the front differential 126 is also shown as a planetary gear differential. A bevel gear differential, or other differential, could similarly be used. As seen in FIG. 2, the ring gear 190 of the front differential 126 is coupled to the ring gear 188 of the first drive unit 108 and therefore operates as the input of the front differential 126. From the ring gear 190, torque is transferred to the two outputs of the differential 126, planetary gears 192 and a sun gear 194. The planetary gears 192 are in turn coupled, via a carrier 196, to the right front half shaft 122 and the right front wheel 120. The sun gear 194 is coupled, via a splined or other engagement, to the left front half shaft 124 and the left front tire 121. Torque is accordingly split between the two front wheels 120, 121 and during turning of the vehicle, the planetary gears 194 and sun gears 192 will rotate relative to one another permitting the inside and outside wheels (relative to the turn) of the vehicle to rotate at different speeds.

By incorporating the power transfer unit 104, in the power train assembly 100 prior to the first drive unit 108, numerous benefits over prior constructions are seen. With reduced torque transferred through the power transfer unit 104, increased packaging flexibility results and the power transfer unit 104 can be constructed with a smaller packaging, reduced weight and simpler design.

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

I claim:

1. A power train assembly for an automotive vehicle adapted for all wheel drive operation, said assembly comprising:
    a transmission assembly having a transmission output;
    a final drive unit having a surface in contact with the transmission output, said final drive unit including a torque multiplier and adapted to provide power to the front wheels of the vehicle;
    a power transfer unit also coupled to said transmission output, said power transfer unit adapted to divert power to the rear wheels of the vehicle and being coupled to said transmission output such that power is received therefrom prior to torque multiplication by said final drive unit.

2. The power train assembly of claim 1 wherein said power transfer unit includes a non-parallel gear set.

3. The power train assembly of claim 2 wherein said non-parallel gear set is a bevel gear set.

4. The power transfer unit of claim 3 wherein said bevel gear set is a hypoid bevel gear set.

5. The power train assembly of claim 2 wherein said power transfer unit further includes a parallel gear set.

6. The power train assembly of claim 2 wherein said parallel gear set includes an input member directly coupled to said transmission.

7. The power train assembly of claim 1 wherein said transmission output is directly coupled to said final drive unit and directly coupled to said power transfer unit.

8. The power transfer unit of claim 1 wherein said parallel gear set is a chain gear.

9. The power transfer unit of claim 1 wherein said parallel gear set includes a first gear wheel unitarily formed with a hub coupled directly to said transmission output.

10. The power transfer unit of claim 1 wherein said parallel gear set is a gear drop.

11. The power transfer unit of claim 1 wherein said final drive unit is a planetary gear set.

12. A power train assembly for a motor vehicle comprising:
    a prime mover;
    a transmission assembly coupled to said prime mover and including a rotatable transmission output;
    a front drive line including a front differential and a pair of front half-shaft assemblies coupled to one each of a pair of front wheels, said front drive line operating as a primary drive line for the motor vehicle;
    a rear drive line operating as a secondary drive line, said rear drive line including a rear drive shaft and a read differential connected to a pair of rear half-shaft assemblies, and a pair of rear wheels coupled to one each of said rear half-shaft assemblies;

an output member adapted to couple to said rear drive line;

a parallel gear set defining parallel input and output axes;

a non-parallel gear set defining non-parallel input and output axes;

one of said parallel gear set and non-parallel gear set being coupled to said transmission output and subsequently coupled to the other of said parallel gear set and said non-parallel gear set, said other of said parallel and non-parallel gear sets being coupled to said rear drive line;

a final drive unit having a surface contacting said transmission output for rotation therewith, said final drive unit including a torque multiplier coupled to said front differential and operating as an input thereto; and said parallel gear set and said non-parallel gear set being coupled to said transmission output such that power is received therefrom prior to torque multiplication by said final drive unit.

13. The power train assembly of claim 12 wherein said parallel gear set includes an input member directly coupled to said transmission.

14. The power train assembly of claim 12 wherein said transmission output coupled to said final drive unit and directly coupled to said power transfer unit.

15. The power train assembly of claim 12 wherein said non-parallel gear set is a bevel gear set.

16. The power train assembly of claim 12 wherein said bevel gear set is a hypoid bevel gear set.

17. The power train assembly of claim 12 wherein said parallel gear set is a chain gear.

18. The power train assembly of claim 12 wherein said final drive unit is a planetary gear set.

* * * * *